3,637,793
PROCESS FOR THE PREPARATION OF
            ETHIONIC ACID
August B. M. van Gysel and Jan E. F. Colle, Ostende,
  Belgium, assignors to UCB Societe Anonyme, Brussels,
  Belgium
No Drawing. Filed Jan. 15, 1968, Ser. No. 697,628
Claims priority, application Great Britain, Jan. 18, 1967,
                    2,598/67
            Int. Cl. C07c 141/02
U.S. Cl. 260—458                                2 Claims

ABSTRACT OF THE DISCLOSURE

Preparation of ethionic acid from sulfur trioxide and ethanol in a proportion of 2 moles: 1 mole at a temperature between 40 and 100° C. using ethionic acid as a reaction medium. In a preferred embodiment, ethanol is introduced below the surface level and the sulfur trioxide above the level of the reaction medium.

---

The present invention is concerned with a process for the preparation of ethionic acid.

This acid has previously been prepared by two methods of synthesis, starting from ethanol and sulfur trioxide:

(1) According to the first method, the reaction between ethanol and sulfur trioxide is carried out in solution in liquid sulfur dioxide. According to one way of carrying out this process (see German patent specification No. 550,572), ethanol is introduced, while stirring and cooling, into sulfur trioxide dissolved in liquid sulfur dioxide. After distilling off the sulfur dioxide, ethionic acid remains behind as residue. According to another way of carrying out this process (see U.S. patent specification No. 2,634,287), the synthesis is carried out continuously by contacting sulfur trioxide dissolved in liquid sulfur dioxide with ethanol in a nozzle. A drop in pressure is produced accompanied by the evaporation of sulfur dioxide which is subsequently reliquefied and recycled, while the ethionic acid is removed for neutralization.

The disadvantage of this method resides in the use of a substance which is extraneous to the reaction, namely, sulfur dioxide, which must be recovered and recompressed in order again to obtain it in liquid form, this representing an important operational expense.

(2) According to the second method of synthesis (see Breslow et al., J.A.C.S., 76, 5361–63/1954), 1 mole of ethanol is reacted at 0° with a first mole of sulfur trioxide and thereafter with a second mole of sulfur trioxide at 50° C. This synthesis has the advantage of not using sulfur dioxide as solvent but suffers from the disadvantage that it must be carried out at two different temperatures and in two stages. Furthermore, the first stage at 0° C. is one which is difficult to carry out on an industrial scale because of the difficulty inherent in the removal of heat. If this removal of heat is not rigorously controlled, there occurs, as a result of local overheating, a vaporisation of the ethanol which enters into reaction with the sulfur trioxide in the gaseous phase. In this case, the reaction becomes uncontrollable and a significant amount of the ethanol is dehydrated with the formation of diethyl ether which not only reduces the yield of ethionic acid but also complicates the isolation of the pure ethionic acid.

It is an object of the present invention to overcome the disadvantages of the known processes for the preparation of ethionic acid and to provide, in addition, advantages which will become apparent from the following description.

The process according to the present invention consists of reacting sulfur trioxide with ethanol at a temperature between 40 and 100° C., preferably between 50 and 70° C., in ethionic acid as reaction medium. The process according to the present invention can be carried out discontinuously, semi-continuously or continuously.

The advantage of the process according to the present invention in comparison with the above-mentioned process (1) is that no solvent is used which is foreign to the reaction, i.e. sulfur dioxide, and, consequently, the cost of recovering this solvent is avoided. In comparison with the above-mentioned process (2), the process according to the present invention has the advantages, first, that the exothermal reaction is completely controlled and, secondly, that the process is carried out in one stage and at the same temperature. Furthermore, with the use of the process according to the present invention, the yield of ethionic acid is practically quantitative and the quality, i.e. purity and color, of the ethionic acid obtained is excellent.

The ethanol used in the process according to the present invention is preferably pure. However, it can also contain water but, in that case, the water reacts with the sulfur trioxide with the formation of sulfuric acid which accompanies the ethionic acid obtained as an impurity. The ethanol used may also contain denaturants, such as methyl ethyl ketone, diethyl ether and the like. However, these materials are sulfonated under the reaction conditions and likewise accompany the ethionic acid produced as impurities.

The sulfur trioxide used may be pure. However, it is also possible to use a product diluted by gases which are inert under the reaction conditions, such as oxygen or nitrogen. In particular, there can be used the gas obtained from a contact plant used in the production of sulfuric acid.

The ethionic acid used in the process according to the present invention as the reaction medium is merely the product obtained in the course of a previous production. The purity of this acid is at least 90% and may even be higher than 99%, the impurities accompanying the acid being principally sulfuric acid produced by the reaction between the sulfur trioxide and the water present in the ethanol, as well as the sulfonation products of denaturants in the ethanol.

The ethanol and the sulfur trioxide are preferably used in stoichiometric amounts, i.e. for each mole of ethanol, there are used 2 moles of sulfur trioxide. However, in the course of the reaction, momentary variations in the respective proportions of ethanol and sulfur trioxide can be tolerated, provided that the temporary excess amount of one or other of the reactants is subsequently compensated for by the appropriate addition of the other reactant during the course of the operation.

The initial quantity of ethionic acid used as the reaction medium should be, at all times, the minimum sufficient to permit a convenient stirring, an effective control of the temperature and the introduction of the ethanol below the surface of the reaction medium. This quantity clearly depends upon the mode of operation chosen, i.e. discontinuous, semi-continuous or continuous, and upon the geometric configuration of the reaction apparatus used.

As stated above, the reaction temperature is between 40 and 100° C., preferably between 50 and 70° C. At temperatures below 40° C., the reaction takes place too slowly to be economically worthwhile, while at temperatures above 100° C., the reaction is very rapid but the product obtained has a tendency to be colored, which degrades its quality.

The working pressure is usually atmospheric pressure. However, the reaction can also be carried out at a pressure above or below atmospheric pressure.

It is advantageous to introduce the sulfur trioxide into the gaseous atmosphere of the reaction apparatus and to introduce the ethanol below the surface of the reaction medium. However, if certain precautions are taken in order to avoid the blockage of the pipe supplying the sulfur trioxide, it is also possible to introduce the sulfur trioxide below the surface of the reaction medium.

Since, in the process according to the present invention, the reaction between the sulfur trioxide and the ethanol to give ethionic acid is extremely rapid, the duration of the reaction for the preparation of a given amount of ethionic acid depends upon the rate at which the sulfur trioxide and the ethanol are introduced. This rate of introduction of the reactants depends upon the effectiveness of the cooling system. In other words, for the production of a given quantity of ethionic acid, the more effective is the cooling system, the greater may be the rate of introduction of the reactants and the shorter is the duration of the reaction, all, of course, bearing in mind the temperature limits of 40 to 100° C., preferably of 50 to 70° C.

The yield of ethionic acid is practically quantitative, referred to the ethanol, while, referred to the sulfur trioxide, it depends upon the amount of water and/or of denaturants in the ethanol. When the ethanol used is anhydrous, the yield of ethionic acid, referred to the sulfur trioxide, is also practically quantitative (above 99%).

The reactor in which the preparation of ethionic acid by the process according to the present invention is carried out, may be constructed from any material resistant to corrosion by ethionic acid at the reaction temperature, especially from glass or stainless steel. However, there is no restriction to the choice of materials for the apparatus provided that they are not corroded by the reactants and do not result in the coloration of the ethionic acid obtained.

The ethionic acid thus obtained is a perfectly limpid liquid with a pale yellow color which may be directly used, in particular, for the production of sodium vinyl sulfonate.

In the following examples, which are given for the purpose of illustrating the present invention, the percentages are by weight unless otherwise indicated.

EXAMPLE 1

This example illustrates the discontinuous method of preparation.

The apparatus used consists of a round-bottomed glass flask of 1 liter capacity, provided with a stirrer, a thermometer, a discharge tube, a tube for the introduction of ethanol extending almost to the bottom of the flask and a tube for the introduction of sulfur trioxide, one end of which is attached to a source of supply for sulfur trioxide, such as a carboy, a flask of boiling oleum or the like, and the other end of which touches the surface of the liquid present in the flask.

The flask is charged with 433 g. 99.2% ethionic acid, corresponding to 429.5 g. 100% acid. At the beginning of the operation, the flask is placed in a waterbath to bring the ethionic acid to a temperature of 50° C. and, at the same time, the stirrer is set into motion. The introduction of sulfur trioxide and of 100% ethanol is started and the waterbath is replaced by an external cooling system using circulating cold water. All the ethanol (92 g.) is introduced in the course of one hour and all of the sulfur trioxide (320 g.) in the course of 90 minutes, the circulation of cooling water being regulated in such a manner as to maintain the temperature constant in the neighborhood of 50° C. At the end of the addition of sulfur trioxide, the operation is stopped.

Balance of the operation:
Ethionic acid at the end of the experiment: 845 g. of 99.4% purity (839.9 g. of 100% purity)
Ethionic acid at the beginning of the experiment: 433 g. of 99.2% purity
Weight of ethionic acid produced: 410.4 g.
Amount of sulfur trioxide used: 320 g.
Amount of ethanol used: 92 g.
Total reactants used: 320+92=412 g.
Amount of ethionic acid actually formed: 845 g.×(0.994) − 433 g.×(0.992)=410.4 g.

Thus, the yield of the operation is 99.6%, referred to the ethanol and to the sulfur trioxide.

The ethionic acid obtained has a pale yellow color.

EXAMPLE 2

The apparatus used is that described in Example 1. Instead of 100% ethanol, there is used 94.6% ethanol. In this experiment, 420 g. 98.5% ethionic acid (413.7 g. of 100% acid) are placed in the flask and there are introduced 97.2 g. 94.6% ethanol (92 g. 100% ethanol) and 343 g. sulfur trioxide. The temperature conditions and the rate of introduction are the same as in Example 1.

There are obtained 859 g. 95.9% ethionic acid (823.8 g. of 100% acid) which is straw-colored.

Balance: There are obtained 410.1 g. 100% ethionic acid (the theoretical yield is 412 g.). The yield, referred to the ethanol, is thus 99.5% and the yield, referred to the sulfur trioxide, is 92.8%, this yield being lower because of the consumption of sulfur trioxide by the water contained in the ethanol, resulting in the formation of sulfuric acid.

EXAMPLE 3

In this example, the operation is carried out at a lower temperature.

Into the same apparatus as described in Example 1, there are charged 400 g. 99.2% ethionic acid (396.8 g. of 100% acid), into which are introduced 92 g. absolute ethanol and 320 g. sulfur trioxide, the reaction temperature being maintained at 40° C. The total duration of the reaction is 3 hours.

The weight of ethionic acid after the reaction is 810 g. of 99.6% acid (806.8 g. of 100% acid), the weight of ethionic acid formed is 410 g., the yield is 99.5% by weight, referred to the ethanol and to the sulfur trioxide, and the ethionic acid obtained has a straw color.

EXAMPLE 4

In this example, the operation is carried out at a higher temperature.

Into the same apparatus as described in Example 1, there is charged 411 g. 99.5% ethionic acid (408.95 g. of 100% acid), into which are introduced 92 g. absolute ethanol and 320 g. sulfur trioxide. The reaction temperature is maintained at 95–100° C. and the total duration of the addition of the reactants is 30 minutes.

The weight of the ethionic acid after the reaction is 823 g. of 99.6% acid (819.7 g. of 100% acid), the amount of ethionic acid formed is 410.8 g., the yield is 99.7% by weight, referred to the alcohol and to the sulfur trioxide, and the ethionic acid obtained has a dark brown color.

EXAMPLE 5

In this example, there is used denatured absolute ethanol containing 3% by volume methyl ethyl ketone. The operating conditions are the same as in Example 1.

The initial quantity of ethionic acid is 400 g. of 99.5% acid (398 g. of 100% acid), the quality of denatured ethanol used is 95 g., the quantity of sulfur trioxide used is 323.3 g. (being 320 g. for the sulfonation of the ethanol and 3.3 g. for the sulfonation of the methyl ethyl ketone), the weight of the ethionic acid after the reaction is 816 g. of 99% acid (807.7 g. of 100% acid), the amount of ethionic acid formed is 409.8 g., the yield is 99.5%, referred to the alcohol, and 98.3% referred to the sulfur trioxide, and the ethionic acid obtained has a straw color.

EXAMPLE 6

This example ilustrates the preparation of ethionic acid on an industrial scale by a continuous method.

The apparatus used consists of a constant-level vessel made of stainless steel of V4A type, surmounted by a column packed with Raschig rings, the upper end of the column being attached to a flue. An external pipe starts from the bottom of the vessel and passes, successively, a pump and a heat exchanger and terminates at the top of the Raschig rings. The pipe for supplying the alcohol opens in the interior of the vessel below the level of the reaction mixture, while the pipe for supplying the sulfur trioxide opens above this level. The constant level of the vessel is ensured by an elbowed overflow pipe.

At the start of the reaction, 98.5% ethionic acid is introduced into the vessel up to the constant level and the acid brought to a temperature of 55° C. by circulating it through the pump, the heat exchanger and the column of Raschig rings. Thereafter, in the course of one hour, there are continuously introduced 15.76 kg. denatured absolute ethanol (containing 3% by volume of 0.46 kg. methyl ethyl ketone), as well as 53.7 kg. gaseous sulfur trioxide (53.2 kg. of which reacts with the ethanol and 0.5 kg. of which with the methyl ethyl ketone). Ethionic acid is continuously drawn off from the vessel at a rate of 68.1 kg. of acid per hour (calculated as 100% acid).

The yield of ethionic acid reaches 99.4%, referred to the alcohol, and 98.5%, referred to the sulfur trioxide. The ethionic acid obtained has a straw color.

EXAMPLE 7

The operation is carried out with the same apparatus and under the same conditions as in Example 6 but the pure gaseous sulfur trioxide is replaced by a contact gas containing 9% sulfur trioxide, the remainder being nitrogen and oxygen.

After having passed into the apparatus, in the course of one hour, 14.2 kg. denatured alcohol (comprising 13.78 kg. absolute ethanol and 0.42 kg. methyl ethyl ketone) and 48.4 kg. sulfur trioxide (calculated as 100% sulfur trioxide) at a temperature of 55° C., there is obtained, per hour, 60.8 kg. ethionic acid (calculated as 100% acid).

The yield of ethionic acid reaches 98.5%, referred to the alcohol, and 97.6%, referred to the sulfur trioxide. The ethionic acid obtained has a straw color.

We claim:

1. A process for the preparation of pale-colored ethionic acid which comprises reacting sulfur trioxide with ethanol in a proportion of 2 moles of sulfur trioxide for each mole of ethanol, at a temperature between 40 and 100° C., under substantially atmospheric pressure, in ethionic acid as the reaction medium.

2. The process according to claim 1, wherein the temperature is between 50 and 70° C.

References Cited

UNITED STATES PATENTS

| | | | |
|---|---|---|---|
| 3,232,976 | 2/1966 | Lohr | 260—459 |
| 2,634,287 | 4/1953 | Fincke | 260—459 |

FOREIGN PATENTS

| | | | |
|---|---|---|---|
| 799,199 | 8/1958 | Great Britain | 260—459 |

OTHER REFERENCES

D. Breslow et al., Synthesis of Sodium Ethylensulfonate From Ethanol, J. American Chem. Soc., 76 (p. 5631) (1954).

LEON ZITVER, Primary Examiner

L. DE CRESCENTE, Assistant Examiner